July 16, 1935. R. D. PIKE ET AL 2,008,154
APPARATUS FOR COOLING DRAUGHT BEVERAGES
Filed July 25, 1933 2 Sheets-Sheet 2
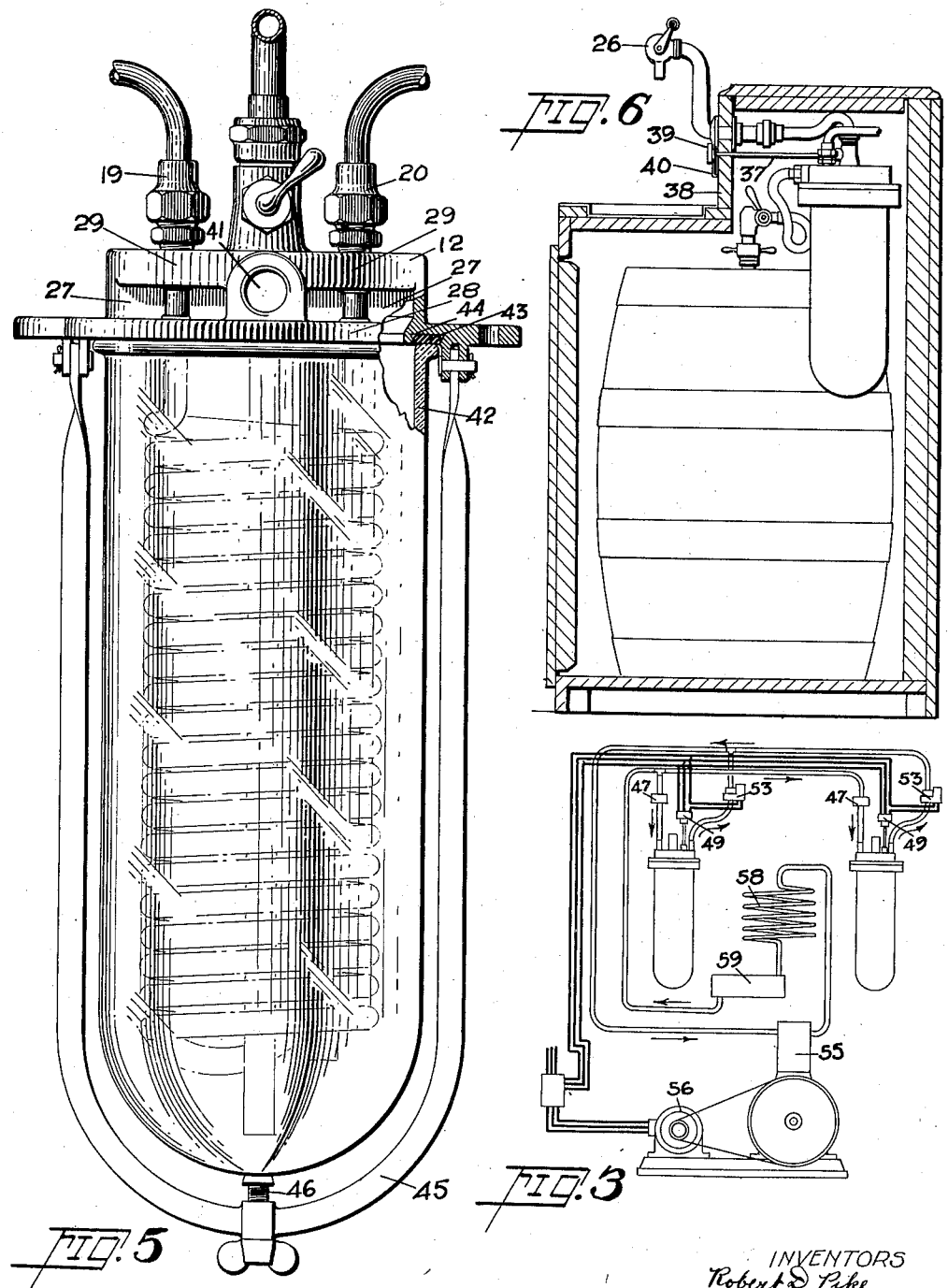

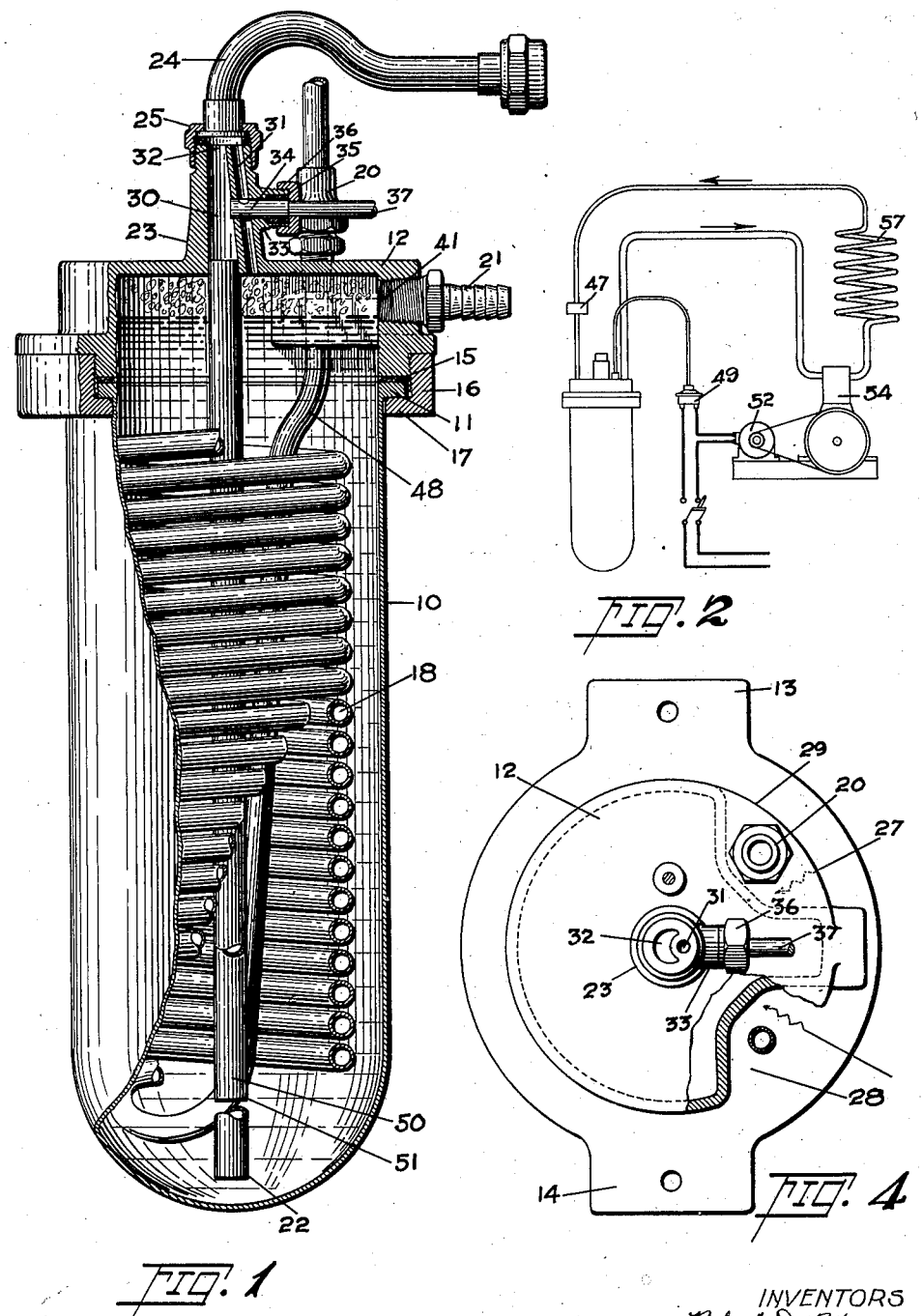

Patented July 16, 1935

2,008,154

UNITED STATES PATENT OFFICE 2,008,154

APPARATUS FOR COOLING DRAUGHT BEVERAGES

Robert D. Pike, Piedmont, and Wolcott P. Stanton, Berkeley, Calif.

Application July 25, 1933, Serial No. 682,054

7 Claims. (Cl. 225—1)

The present invention relates to a method and apparatus for cooling and dispensing draught beverages, and is particularly adapted to the cooling and dispensing of draught beer although it can be applied to other liquids.

The principal objects of the invention are to provide a method for cooling and dispensing draught beer whereby a considerable quantity of beer is held within accurately controlled temperature limits and under pressure in an intermediate storage tank adjacent the dispensing spigot, the said temperature limits being so chosen as to impart to the beer the maximum degree of potability whereby the beer can be held in storage or continuously draughted as may be desired, always at the desired temperature; to provide means in juxtaposition to the dispensing spigot for the manual control, independently of the operation of the said spigot, of the foam or bead on the glass of beer as it is drawn; to provide means for easily and quickly disassembling the apparatus in such a manner that all of the surfaces which have been in contact with the beer are directly accessible for mechanical cleaning, thus eliminating the necessity for costly cleaning of these surfaces when inaccessible by the use of chemicals, and for reassembling the apparatus. A further object is to provide a simple and small apparatus which can be installed adjacent to the beer keg in the storage space usually provided for the same, and which will serve as a refrigerant for the said space in such an economical manner that but little additional load will be placed upon the refrigerating means, which is preferably of the mechanical type and which is primarily provided for cooling the beer in storage in the apparatus.

These and other objects will become apparent upon reading the appended description, taken in connection with the accompanying drawings. On such drawings—

Fig. 1 is an elevation, partly in section;

Fig. 2 is a diagrammatic view illustrating the relationship of the beer cooling, conditioning and dispensing means with the mechanical refrigerating system, in which a single means is attached to a single compressor;

Fig. 3 is analogous to Fig. 2, but shows the preferred arrangement when two or more cooling, conditioning and dispensing means are connected with one compressor;

Fig. 4 is a plan view looking down on Fig. 1;

Fig. 5 is a modification in which the container for the cooled, conditioned beer is made of glass; and Fig. 6 is a cross-sectional view showing assembly of the beer cooler, conditioner, dispenser in a conventional keg cabinet or box.

In present methods for cooling draught beer, the beer is usually drawn from a keg through a long length of pipe in contact with ice-water or other refrigerant. This method is subject to several inherent disadvantages which may be summarized as follows:

(1) At intervals the beer-cooling pipe has to be cleaned and as access to its interior by mechanical means is impossible, because the pipe usually has an outside diameter of about one-half inch and is about thirty feet long, cleaning must be accomplished by means of cleansing solutions which will run through the pipe.

(2) When the pipe is immersed in ice-water, the latter is at or near 32° F. If the draught of beer is at a slow rate, the beer stands in the coil a long time, and whereas beer should be at 40° to 45° F. for maximum potability, it becomes chilled under these circumstances to 34° to 36° F. and is too flat and cold for correct dispensing. If it is sought to overcome this difficulty at low rates of draught by immersing the coil in water which is held by some suitable means at a temperature somewhat above 32° F., the beer will not be sufficiently cooled when drawn at a high rate of draught; and this latter condition may also lead to the drawing of "wild" or unduly gassy beer which is all the more difficult to cool while passing through the pipe because of the poor conductivity for heat of the gas bubbles which are present in it.

(3) In those cases where the beer coil is immersed in the liquid refrigerant which boils as the warm beer passes through the coil, great difficulty has been caused by the over-chilling of the beer. Furthermore, such systems have but little storage capacity for cold beer and, as a result, refrigerating means of excessive size have to be furnished to correspond to the maximum rate at which the beer is drawn. Also in such systems, if warm cleansing liquids are run through the pipes, an excessive boiling pressure is developed by the refrigerant, necessitating the provision of auxiliary tanks into which it may be withdrawn.

By our present invention we provide a novel method and apparatus for overcoming these and other difficulties which are met with in practice. We recognize that attempts have heretofore been made to dispense beer from a secondary reservoir interposed between the keg and the spigot, but none of these earlier methods provides the numerous novel advantages and improvements embodied in our invention, which makes the same of great practical value in commercial use.

These advantages include the following, among others which will appear from reading the description:

(1) Rapid and accurate control of the temperature of the beer which is held in intermediate storage without ever over-chilling any portion thereof;

(2) Independent manual foam control in juxtaposition to the spigot;

(3) Easy and rapid means for taking apart and putting together;

(4) When disassembled, all beer contacting surfaces are available for mechanical cleaning;

(5) Apparatus is so small and compact that it can be installed in conventional beer cabinets and when so installed, the means for easy mechanical cleaning are not impaired because the disassembling can be accomplished by moving the bowl downwardly without removing the top of the cabinet, which is often installed underneath a bar;

(6) The apparatus is so arranged when installed in a keg cabinet that the intermediate storage of potable beer at 40° to 45° F. acts as the refrigerating means for maintaining the kegs themselves at a temperature below 55° F. By utilizing the cold beer in intermediate storage for this purpose, the cooling of the keg is accomplished with great economy and free from the danger of desiccating and warping of the keg staves which is ever present when low-temperature, direct-expansion cooling coils or other equivalent surfaces are employed for cooling the interior of the keg cabinet.

As an intermediate reservoir we provide a bowl or jar-like receptacle 10, which is preferably made of sixteen-gauge copper or brass, of about five (5) inches in diameter by thirteen (13) inches long and holding approximately one gallon. It is to be noted that the dimensions and precise shape given here, as well as hereafter, are not essential but are preferable for bar and fountain use.

The bowl is preferably provided with a flange 11 and has a removable top member 12, preferably a gun metal bronze casting, and has thereon the supporting brackets 13 and 14. A gasket, preferably of rubber, is located between the flange 11 and the top 12, and a threaded ring 16, the threads of which engage with corresponding threads on the top member, provides a gas-tight connection between the bowl and the top piece or gun metal bronze casting 12, by means of the flange 17 which is a part of the ring 16, the two flanges engaging each other, as illustrated on Fig. 1.

A cooling coil 18 is supported from the top piece to be suspended within the bowl, and this is preferably made of copper tubing of about one-half (½) inch or three-eighths (⅜) inch outside diameter and preferably about fifteen (15) feet long. This tubing passes at both ends through the top 12 in a gas-tight manner, and terminates in the fittings 19 and 20, the refrigerant entering at 19 and leaving at 20. Relatively warm beer from the keg or other container enters the bowl through a straight fitting 21 provided at the side top of casting 12 and connected therewith in a gas-tight manner. A pipe 22 extends almost to but short of the bottom of the bowl, and is fitted in a gas-tight manner into the boss 23 which is integral with the top member 12. A pipe 24, suitably connected to the pipe 22 by the fitting 25, leads the cooled and conditioned beer to the spigot 26, which is not shown on Fig. 1.

Whenever a joint occurs in a pipe, there also occurs the possibility of a leak. Such a joint occurs where the fittings 19 and 20 are attached to the coil, and if such a leak occurred and if in occurring it permitted any of the refrigerant to enter the beer, obviously a very serious condition would exist inimical to the success of the entire installation. We overcome such possibility by means of the recesses 27. The ends of the coil first pass through the wall 28 where they are soldered in a gas-tight manner, and then pass into the wall 29 where they are connected with the fittings 19 and 20 through a joint. By this arrangement, which we refer to in the claims as a "ventilated joint", any leak of refrigerant which might occur at the joint would pass harmlessly out into the atmosphere.

The boss 23 is about two (2) inches higher than the upper level of the top casting 12 and is provided with a double passage, as shown, the passage 30 being for the beer which is drawn from the bottom of the bowl, and the slanting passage 31 for establishing communication between the top of the bowl and the beer discharge pipe 24 at a level substantially at the upper end of the beer passage 30. This novel arrangement provides a Venturi-like restriction at 32 which increases the velocity of the beer as it passes through the passage on its way to the spigot, thus reducing its pressure and thereby creating a pressure difference which causes gas and/or beer to flow upwardly through the passage 31. This gas is also given a tendency to flow upwardly through 31 by the difference in hydrostatic heads at top and bottom of the beer column within the boss 23. Should the level of beer within the bowl lower due to an accumulation of gas in the top, this hydrostatic difference in head, which tends to cause the gas to flow upwardly through the passage 31, is increased and a natural tendency is set up to cause the gas in the top of the bowl to flow upwardly through the passage 31 while beer is being draughted.

We prefer to make the passage 31 about twice as large in cross-section as is necessary in practice to remove all of the gas which may accumulate in the top of the bowl, and we control the net size of the opening by means of a manually operated valve comprising the box 33, the plug 34 and the packing ring 35. The plug and packing ring are secured by the nut 36. The valve stem 37 passes through the dashboard 38 immediately beneath the spigot and is connected with a knob 39 and indicator 40, which shows the operator the setting of the valve and permits him to control its opening so as to regulate the bead or foam on the beer and to prevent the formation of a gas pocket in the top of the bowl.

When the beer keg is empty, the operator is immediately apprised of this fact by the beer becoming "wild". At this juncture he closes the valve 34 entirely so that no gas can pass upwardly through the passage 31 and then he may draw substantially all the beer out of the bowl through the spigot 26.

It will be noted that all pipe connections are made to the head or top casting 12 and that this is permanently secured in place by the brackets 13 and 14, which may have any convenient attachment. Thus when the ring 16 is unscrewed, the bowl 10 may be removed downwardly and all surfaces be immediately exposed for mechanical cleaning. By unfastening the beer inlet from pipe 21, the beer inlet passage 41 can be cleaned by passing a brush through it. Likewise, by unscrewing the joint 25 and removing the pipe 24 which connects with the spigot 26, both the inside of the beer outlet pipe 22 and the passages 30 and 31 can be cleaned by passing brushes through them.

The accessibility of all surfaces as provided by us not only makes mechanical cleaning easy and effective, but also makes it easy to tin-plate or silver-plate these surfaces in manufacture. It will be understood that all copper or bronze surfaces which come into contact with beer should be protected preferably either by being hot-dipped in tin or electroplated with silver.

We have found that when our cooler, conditioner, dispenser is installed on a counter in a visible location, it is often desirable to make the bowl 42 of glass. This is preferably accomplished by omitting the threaded ring 16 and by providing a soft rubber gasket 43 set in a groove 44 in the top casting 12. The glass jar is pressed into place against this gasket by the screw and yoke combination 45, 46. The use of a glass bowl has the advantage of displaying the beer within the bowl and also of somewhat reducing loss of cold, which becomes a factor when the apparatus is installed outside of a beer cabinet.

In case of outside installations with metal bowls, we prefer to cover their outside surfaces with some suitable insulating material. We may use porcelain or any other suitable material in place of glass or metal for the bowl.

In many respects the connection with any suitable mechanical refrigerating system is conventional, but in actual practice we have discovered that certain new combinations and novel requirements are necessary. One of the requirements is that when the bowl is filled up with warm beer to replace a heavy draught, the cooling action of the coils must be very rapid so that cold beer will again be quickly available but at the same time the temperature of the coil may not be below about 29° F., lest some beer in direct contact with it be frozen which would result in spoiling the flavor of all of the beer in the bowl. We accomplish rapid cooling with a coil at 29° F. by passing through the same when in operation at high velocity a refrigerant vapor rather than a refrigerant gas. This we accomplish in practice by a proper proportioning of the coil and compressor; for example, if the bowl holds one gallon of beer, we use fifteen (15) feet of three-eighths (⅜) inch outside diameter copper tubing in the coil, and we use a conventional one-sixth (⅙) horsepower methyl chloride compressor operating at twenty (20) pounds per square inch pressure on the low pressure side, or equivalent, and by adjusting the speed of the said compressor so that when operating the coil will be substantially filled with high velocity vapor of the refrigerant rather than being partly filled with vapor and partly filled with gas. It will be understood that the distinction here used between vapor and gas is that the former is a gas in which are suspended numerous droplets of liquid refrigerant, whereas a refrigerant gas is one in which all of these droplets have disappeared by evaporation. By keeping the coil filled with a rapidly moving vapor instead of the gas, the rate of heat transfer per square foot of coil is greatly increased, and the cooling of the beer is made very rapid even though the temperature of the coil is so high that no actual freezing can take place.

In practice the refrigerant enters an automatic expansion valve 47 of any suitable well known design, which is set for twenty (20) pounds back pressure when using methyl chloride as the refrigerant, and at corresponding pressures with other refrigerants to obtain the equivalent temperature; thence through fitting 19 into the coil 18 and passing downwardly flows out through the riser 48 and fitting 20. Temperature control is had by means of a thermostatic switch 49 of any well known make, the element 50 of which is inserted in a glycerine filled well 51 which is immersed in the beer. We have found it desirable to have this element immersed nearly to the bottom of the bowl and to effect a metal-to-metal contact between the outside bottom of the well and the coil, because we have found that this degree of immersion gives, in practice, the most satisfactory and accurate control of the temperature of the beer as it is drawn through the spigot. We usually set the thermostatic switch to shut off the refrigerant when the beer is at 42° F. and to open again at 45° F.

We have described the method of refrigeration, temperature control and coil design which we have found preferable in the practice of our invention, but it will be clear to those skilled in the art that other means may be employed without departing from the spirit of our invention, as, for example, changes in the shape of the cooling surfaces or the use of a "flooded" system instead of a so-called "dry expansion" system.

When one cooler is attached to one compressor 54, the thermostatic switch operates to turn on or off the electric motor 52 which drives the compressor. When two or more coolers are attached to one compressor 55, the thermostatic switch operates to open or close a solenoid valve 53 associated with each cooler. The operation of this valve is either to have the line through which the refrigerant passes from the coil to the compressor wide open or shut off entirely. Thus as the beer in each cooler in the system reaches the minimum temperature of 42° F., the thermostatic switch in the beer operates to close the solenoid valve associated with that cooler; but so long as the beer in any one cooler in such a multiple system is above 45° F., the wiring is so arranged that the motor 56 continues to run the compressor 55. When all the coolers in such a multiple system contain beer which is below 45° F., the wiring is so arranged that the motor running the compressor is shut off and is started again when the beer in any one cooler becomes warmer than 45° F. The sensitive temperature control of the beer in storage, which usually amounts to one gallon, is only made possible by our system of rapid heat transfer from coils immersed in the beer which at the same time are not cold enough to freeze any portion of the beer. In this way we may hold the beer for some time at a correct temperature for drinking and give it an opportunity to come into a stable relation with carbon dioxide gas at the proper temperature and pressure for dispensing. If, for example, the beer in the keg is at 55° F., the beer in the bowl at 42° to 45° F. will hold more gas in solution per unit of volume than the beer in the keg, and this gas has to pass up from the keg into the beer in the bowl and become reabsorbed by the cooler beer therein. We have found that by keeping the beer sensitively regulated at the correct potable temperature and in contact with $CO_2$ gas under pressure of five to ten pounds per square inch for a relatively long period of time, such as is obtained in practice when serving one spigot from a bowl of one gallon capacity, we are able to improve the flavor and dispensing properties of any given beer, notably in respect to providing it with a more velvety foam. It will be obvious that any other method of refrigeration than that practised by us, as for example immersing a bowl as a whole in cold water, cannot give the sensitive and rapid adjustment to the correct temperature which is essential in practice for obtaining the best results.

It will be understood that in both set-ups in Figs. 2 and 3 the compressors 54, 55 deliver compressed refrigerant in the usual manner through condenser coils 57, 58, thence into liquid receiver 59, thence to expansion valves 47.

The use of the cold beer in the bowl 10 as a refrigerant for the keg or kegs in the keg cabinet is a valuable feature of our invention, as will be perceived by considering alternative methods for accomplishing this by mechanical refrigeration. One method in present-day use is to place direct expansion coils in the keg cabinet. This involves a separate refrigeration circuit with valves, etc., and in practice it has been found that this method tends to dry out and shrink the keg staves. Another method would be to install in the beer cabinet one of the well known types of cooler which contain a pool of refrigerant in which the beer coil is immersed. The same objection in reference to drying out the staves pertains to this method and, in addition, such a method results in the excessive loss of cold because of the low surface temperature of the cooler. By utilizing the cold beer in intermediate storage in our method at 42° to 45° F. as the keg cabinet refrigerant, we maintain a well insulated cabinet at 50° to 55° F., which keeps the beer in the keg below the spoiling temperature, and accomplishes this without drying out the staves of the kegs and in an extremely economical and efficient manner.

While we have described our invention in detail, yet it is to be understood that this is done by way of exemplification and not by way of a limitation of the invention, and that various features may be changed without departing from the spirit of the invention, the scope of which is defined in the appended claims.

In the claims we wish it to be understood that the terms "jar" and "bowl" are each synonymous with the meaning of intermediate storage or reservoir as employed in the specifications. We also wish it understood that the terms "gas" and "foam" are used synonymously.

Having described our invention, what we claim is:—

1. A bowl for holding and cooling draught beverages, containing gas, for dispensing, with a top closure, a vertical boss on said top closure, a connection from the top of said boss to a dispensing spigot, a passage within said boss connecting with the liquid within the bowl, and a second passage within said boss connecting with the top of said bowl, the two passages meeting and merging at the entrance to the connecting pipe at said spigot.

2. A bowl for holding and cooling draught beverages, containing gas, for dispensing, with a top closure, a vertical boss on said top closure, a connecting pipe from the top of said boss to a dispensing spigot, a passage within said boss connecting with the liquid within the bowl, a second passage within said boss connecting with a space at the top of said bowl, a valve in said second passage for regulating the size thereof, the two passages meeting and merging at the entrance of the connecting pipe to said spigot.

3. A bowl for holding and cooling draught beverages, containing gas, for dispensing, with a top closure, a vertical boss on said top closure, a connecting pipe from the top of said boss to a dispensing spigot, a passage within the boss connecting with the top of the bowl, a second passage within said boss connecting with the beverage within the bowl, the latter passage being of progressively smaller cross-section from bottom to top, the two passages meeting and merging at the entrance to the connecting pipe to said spigot, thus producing a Venturi effect to draw gas through the first-named passage.

4. In a closure for a bowl containing a beverage, refrigerating pipes passing through said closure, ventilated joints between said pipes and said closure whereby the pipes carrying the refrigerant pass unjointed through the wall immediately adjacent the beverage, the joint being located in the second wall, and an opening to atmosphere being provided between the two walls whereby in the event of a leak of refrigerant at the joint the same will pass out into the atmosphere.

5. In a beer dispensing apparatus, in combination, a keg, a keg cabinet, a heat-conductive bowl within said cabinet, means for flowing beer from the keg into the said bowl, means for dispensing beer from said bowl, a cooling coil in the beer within the said bowl which maintains the beer at potable temperature, whereby the said beer acts directly through the heat-conductive walls of the bowl as a refrigerant for keeping cool the interior of said cabinet.

6. A cooling and dispensing device for carbonated beverages comprising in combination, a relatively fixed head, a removable jar depending therefrom for holding the beverage, a refrigerant means immersed in said beverage, a thermostatic means for controlling admission of refrigerant to the refrigerant means so as to control the temperature of the beverage within prescribed limits, a means for allowing the jar to be filled with said beverage and for drawing the same therefrom, and means for dispensing the beverage and for controlling excessive foaming of the dispensed beverage.

7. A cooling and dispensing device for carbonated beverages, comprising in combination, a relatively fixed head which accommodates outlet and inlet pipes, a removable jar free from pipe connections depending therefrom for holding the beverage, a refrigerant surface immersed in said beverage, thermostatic means for controlling admission of refrigerant to the said surfaces so as to control the temperature of the beverage within prescribed limits, means for allowing the jar to be filled with said beverage and for drawing the same therefrom, and means for dispensing the beverage and for controlling excessive foaming of the dispensed beverage.

ROBERT D. PIKE.
WOLCOTT P. STANTON.